United States Patent
Toyonoh et al.

(10) Patent No.: US 7,795,943 B2
(45) Date of Patent: Sep. 14, 2010

(54) INTEGRATED CIRCUIT DEVICE AND LAYOUT DESIGN METHOD THEREFOR

(75) Inventors: Yutaka Toyonoh, Tokyo (JP); Tomohide Miyagi, Ibaraki-ken (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/340,247

(22) Filed: Dec. 19, 2008

(65) Prior Publication Data
US 2009/0189641 A1 Jul. 30, 2009

(30) Foreign Application Priority Data
Dec. 21, 2007 (JP) ............... 2007-330215

(51) Int. Cl.
*H03K 3/00* (2006.01)
*H03K 17/693* (2006.01)
(52) U.S. Cl. .................. 327/295; 327/293; 327/291; 327/276; 326/93; 716/16
(58) Field of Classification Search ............. 327/293, 327/295, 291; 326/93; 716/6, 12, 13
See application file for complete search history.

(56) References Cited
U.S. PATENT DOCUMENTS

| | | | | |
|---|---|---|---|---|
| 6,020,774 A * | 2/2000 | Chiu et al. | .................. | 327/295 |
| 6,440,780 B1 * | 8/2002 | Kimura et al. | .............. | 438/129 |
| 6,651,230 B2 * | 11/2003 | Cohn et al. | ..................... | 716/6 |
| 6,864,720 B2 * | 3/2005 | Kanazawa | ................... | 326/93 |
| 6,941,533 B2 * | 9/2005 | Andreev et al. | ................ | 716/6 |
| 7,117,472 B2 * | 10/2006 | Auracher et al. | .............. | 716/13 |
| 7,178,124 B1 * | 2/2007 | Makarov et al. | .............. | 716/12 |
| 7,461,365 B1 * | 12/2008 | Galbi et al. | ................... | 716/16 |
| 7,486,126 B2 * | 2/2009 | Shimazaki | .................. | 327/295 |
| 2003/0135836 A1 * | 7/2003 | Chang et al. | .................. | 716/11 |
| 2005/0275441 A1 * | 12/2005 | Saado et al. | ................. | 327/291 |
| 2008/0127018 A1 * | 5/2008 | Alpert et al. | .................. | 716/10 |
| 2009/0293035 A1 * | 11/2009 | Galbi et al. | ................... | 716/16 |

\* cited by examiner

*Primary Examiner*—Vibol Tan
(74) *Attorney, Agent, or Firm*—Robert D. Marshall, Jr.; W. James Brady; Frederick J. Telecky, Jr.

(57) ABSTRACT

An integrated circuit device has multiple first circuit elements arranged in a first area. A signal distribution circuit that has multiple drive circuits is connected in the form of a tree structure and that distributes a common signal that is input to the starting point of said tree structure to each of the multiple first circuit elements through the same number of levels of drive circuits. At least some of the drive circuits of the tree structure are arranged one each in each of multiple second areas into which the first area is divided to include approximately the same number of the first circuit elements, and the common signal is supplied to the first circuit elements included in the second area where they are arranged.

11 Claims, 16 Drawing Sheets

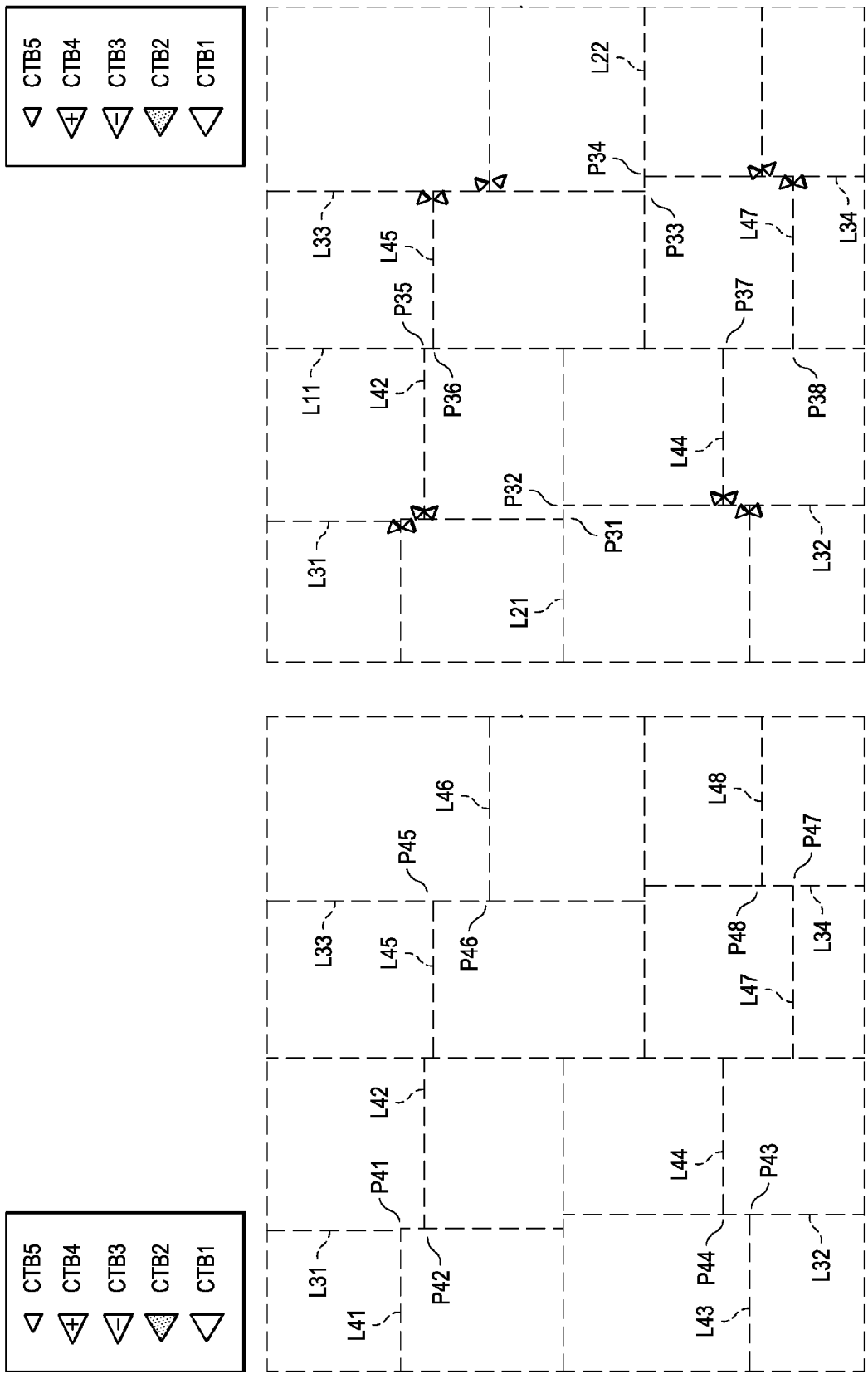

INTEGRATED CIRCUIT DEVICE AND LAYOUT DESIGN METHOD THEREFOR

FIELD OF THE INVENTION

The present invention relates to an integrated circuit device provided with a circuit that distributes a common signal to many circuit elements, for example, a clock tree, and to a layout design method therefor.

BACKGROUND OF THE INVENTION

With synchronization circuits, generally, a clock tree is used for the purpose of distributing a common clock signal with uniform timing to many flip-flops. An H tree structure or mesh tree structure or the like is widely used as the clock tree structure (refer to "Clock Distribution Networks in Synchronous Digital Integrated Circuits," Proceedings of the IEEE, US, IEEE May 2001, Vol. 89, No. 5, pp. 665-692.

With an H tree structure, clock buffers are arranged symmetrically so that the wiring that connects each level of the tree is in an H-type symmetrical shape. Wiring lengths from the tree starting point to the flip-flops are approximately equal because of this, and there is little skew in the clock signal.

With a mesh structure, wiring in a symmetrical mesh form is formed on a semiconductor chip. Clock buffer inputs at the clock tree termini are connected symmetrically to some of the points of intersection of the mesh wiring. Clock buffer outputs one level before the clock tree termini are connected to other points of intersection of the mesh wiring to be symmetrical for each input of the clock buffers at the clock tree termini. By using such a structure, wiring lengths from the tree starting point to the flip-flops are approximately equal, and variation in clock buffer drive capability is equalized, so skew is even smaller.

The H tree structure and mesh structure described above are primarily used in fast circuits. With large-scale LSIs, a technique called CTS (clock tree synthesis) to automatically synthesize a clock tree with an EDA tool is generally used.

However, because the layout of flip-flops on a circuit board is essentially irregular, in a large-scale LSI in particular, it is difficult to apply a clock tree with a symmetrical structure, such as an H tree structure or mesh structure. With a technique where the clock tree arrangement is fixed in advance, because significant restrictions are applied to the flip-flop arrangement, layout design automation is difficult, and in large-scale LSl design, the disadvantage is that layout requires a large amount of time.

On the other hand, with a technique where a clock tree is synthesized automatically with an EDA tool, there is a tendency for many buffers to be inserted to satisfy requirements such as skew or load capacitance. For this reason, there are disadvantages, i.e., power consumption is greater and clock signal delay increases. And because variation occurs in buffer characteristics even on the same chip, there is the disadvantage that as the number of buffers increase, clock signal timing variation increases.

SUMMARY OF THE INVENTION

The present invention was devised in consideration of this situation. A general objective is to provide an integrated circuit device with which the power consumed in the distribution of a common signal, such as a clock signal, can be reduced, and that can suppress variation in common signal timing, and to provide a layout design method to design the layout of such an integrated circuit device.

This and other features and objects are attained in accordance with an integrated circuit device pertaining to a first aspect of the present invention is provided with multiple first circuit elements arranged in a first area, and a signal distribution circuit that has multiple drive circuits connected in the form of a tree and that distributes a common signal that is input to the point of origin of the tree structure to each of the first circuit elements through the same number of levels of drive circuits. At least some of the drive circuits in the tree structure are arranged one each in each of multiple second areas into which the first area is sectioned so that approximately the same number of the first circuit elements is included, and supply the common signal to the first circuit elements included in the second areas where they are arranged. The drive circuits arranged one each in each of the multiple second areas are drive circuits at the termini of the tree structure, for example.

The second areas can be subdivisions wherein a higher-order section is divided into multiple lower-order sections with section lines that extend longitudinally or laterally in the first area, and are areas obtained by repeating subdivision to divide higher-order sections so that the multiple lower-order sections include approximately the same number of the first circuit elements. The drive circuits can also be arranged at the edges of the second areas. In this case, the multiple drive circuits could also be arranged adjacent to points of intersection where two or more of the section lines cross.

At least some of the drive circuits of the tree structure could also be arranged adjacent to the point of intersection of the lowest-order section line in the subdivision and a section line one order higher than the section line. For example, the drive circuits arranged one each in each of the multiple second areas are arranged adjacent to the point of intersection of the lowest-order section line in the subdivision and a section line one order higher than the section line.

The multiple drive circuits could also be arranged adjacent to the point of intersection of a section line for which the intersection point is adjacent to the drive circuit at the next level in the tree structure and a section line of a higher order than the section line. The wiring that connects the multiple drive circuits can be formed along the edges of the second areas.

The integrated circuit device could also have multiple second circuit elements that propagate the common signal output from the multiple first circuit elements, and multiple third circuit elements to which the common signal is ultimately input from the first circuit elements through the same number of levels of the second circuit elements. In this case, at least some of the first circuit elements and the second circuit elements could also be arranged at the side closest to the drive circuits at the termini of the tree structure positioned in a higher-order level, in the smallest quadrilateral area that includes the last-level circuit elements.

A second aspect of the present invention relates to a layout design method to design the layout of an integrated circuit device provided with multiple first circuit elements arranged in a first area, and with a signal distribution circuit that has multiple drive circuits connected in the form of a tree, and that distributes a common signal input to the starting point of the tree structure to each of the first circuit elements through the same number of levels of drive circuits. The layout design method has a first step wherein the first area is sectioned into multiple second areas so that approximately the same number of first circuit elements is included, and a second step wherein at least some of the drive circuits of the tree structure are arranged one each in each of the multiple second areas, and the drive circuits are arranged in the second areas. The drive circuits are arranged one each in each of the multiple second areas in the second step are drive circuits at the termini of the tree structure, for example.

The integrated circuit device could also include multiple second circuit elements that propagate the common signal output from the multiple first circuit elements, and third circuit elements to which the common signal output from the first circuit elements is ultimately input. In this case, the layout design method could also have a third step to insert the drive circuits as the first circuit elements or the second circuit elements in at least some of the paths, so that the same number of levels of the second circuit elements are present in all the paths where the common signal is propagated to the multiple third circuit elements from the multiple first circuit elements.

BRIEF DESCRIPTION OF THE DRAWINGS

FIGS. 9A to 9E together illustrate an example of a clock tree buffer arrangement method.

REFERENCE NUMERALS AND SYMBOLS AS SHOWN IN THE DRAWINGS

In the figures ICG1-ICG2 represent first-second clock gates; CTB1-CTB5 represent first-fifth clock buffers; FF represents a flip-flop; L11, L21, L22, L31-L34, L41-L48 represent section lines; A1 represents an ICG1 circuit arrangement area; A401-A416 represent sectioned areas; and P21, P22, P31-P38, P41-P48, represent section line points of intersection.

With the present invention, power consumption can be reduced and common signal timing variation can also be suppressed by limiting the number of drive circuits used for distribution of a common signal. Below, this invented integrated circuit device and the layout method therefor will be explained referring to figures.

Figure 1:
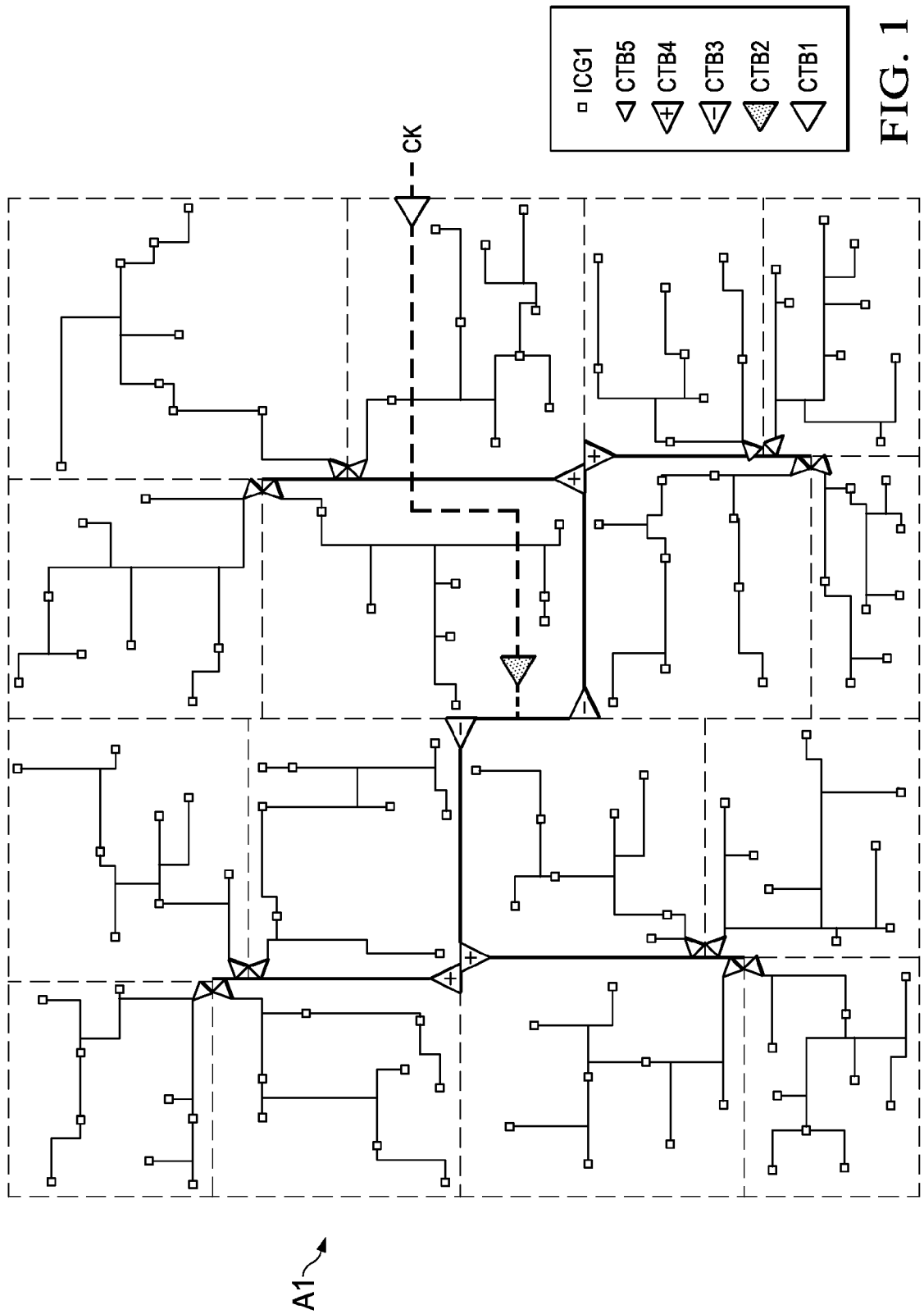
FIG. 1 is a figure illustrating an example of the layout of an integrated circuit device pertaining to an embodiment of the present invention.

FIG. 1 is a figure illustrating an example of the layout of an integrated circuit device pertaining to an embodiment of the present invention.

The integrated circuit device pertaining to this embodiment is where flip-flops, logic gates and other circuit elements, and the wiring that connects them, are formed connected electrically on a semiconductor chip. With the layout in FIG. 1, of the groups of circuit elements that operate synchronized with a clock signal CK, only the circuit elements and wiring relating to distribution of clock signal CK are shown.

Figure 2:
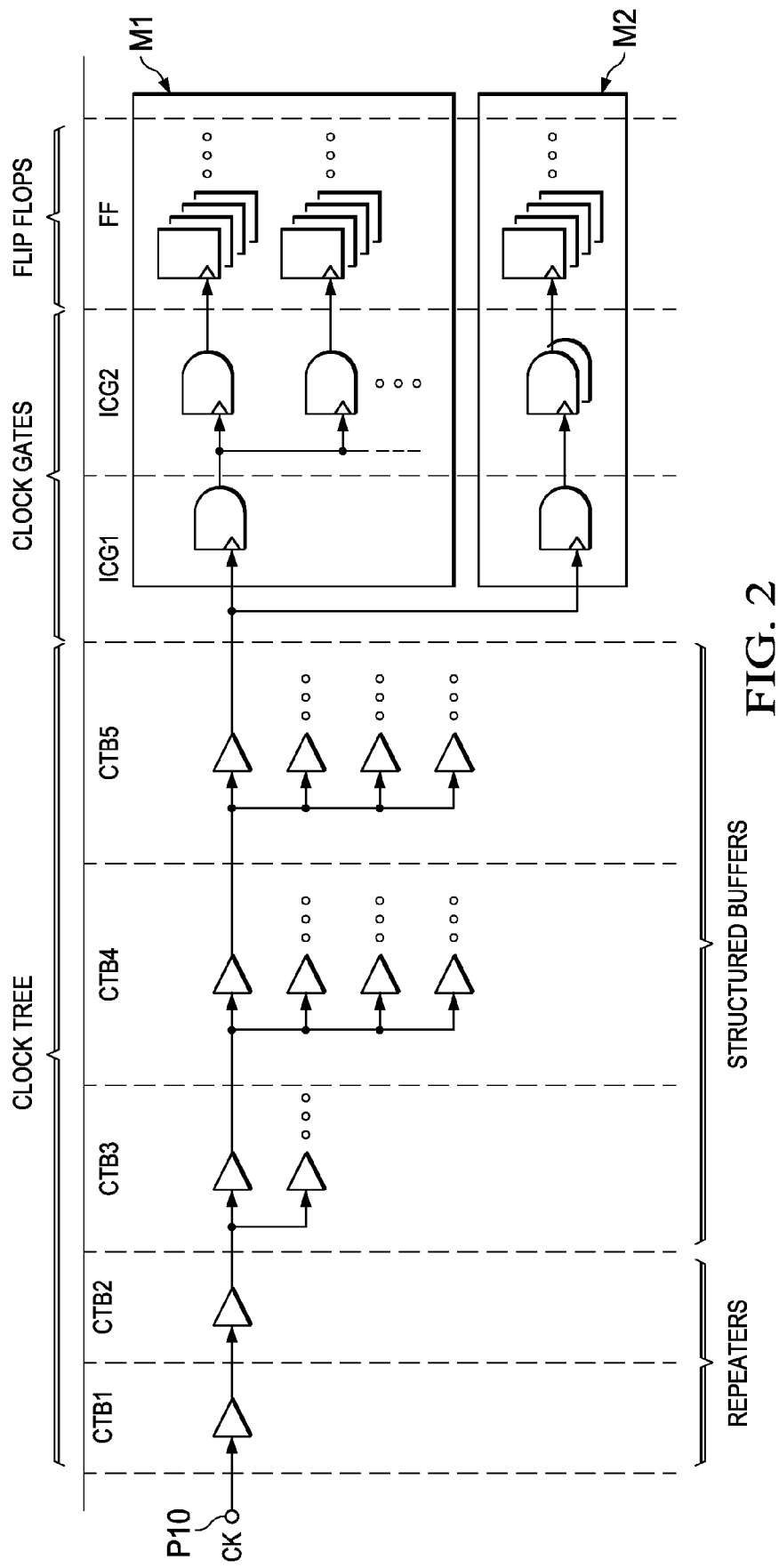
FIG. 2 is a figure showing a circuit configuration example relating to clock signal distribution in an integrated circuit device pertaining to an embodiment of the present invention.

FIG. 2 is a figure showing an example of circuitry relating to the distribution of clock signal CK.

The integrated circuit device pertaining to this embodiment, as shown in FIG. 2 for example, has circuit modules M1, M2, . . . that operate based on a common clock signal CK. Each circuit module is configured with flip-flops (which hereafter may be referred to as "FF" (flip flop)), logic gates or other circuit elements. The clock signal is input to each FF through a clock gate. A clock gate (which hereafter may be referred to as "ICG" (integrated clock gate)) is a logic gate that controls input of the clock signal to an FF. In the example in FIG. 2, the number of ICG levels is set uniformly at 2 levels. That is, the clock signal is input to each FF of circuit modules M1, M2 . . . through 2 levels of ICGs. Hereafter, the first level of clock gates is referred to as "ICG1", and the second level of clock gates as "ICG2". As described below, buffers inserted to make the number of levels uniform in 2 levels are also included in the ICGs.

Here, ICG1 is an embodiment of the first circuit element in the present invention.

ICG2 is an embodiment of the second circuit element in the present invention.

FF is an embodiment of the third circuit element in the present invention.

A clock tree is a circuit for distributing a clock signal with uniform timing to each FF of circuit modules M1, M2 . . . , and has multiple clock buffers connected in the form of a tree (which hereafter may be referred to as a "CTB" (clock tree buffer)). In the example in FIG. 2, the number of CTB levels from the starting point of the clock tree to the termini is uniformly set at 5 levels. Hereafter, the first to fifth CTBs are referred to as "CTB1"-"CTB5", respectively.

CTB3, CTB4 and CGB5 are CTBs in portions that branch in the form of a tree in the clock tree, and are arranged at points of intersection of circuit arrangement area section lines as described below. In this embodiment, these CTBs are specifically called "structured buffers."

On the other hand, CTB1 and CTB2 are CTBs inserted in portions in the clock tree where wiring does not branch and primarily have the role of repeaters that drive wiring capacitive load.

Here, the clock tree shown in FIG. 2 is an example of a signal distribution circuit in the present invention.

CTB3, CTB4 and CTB5 are examples of drive circuits in the present invention.

Figure 3:
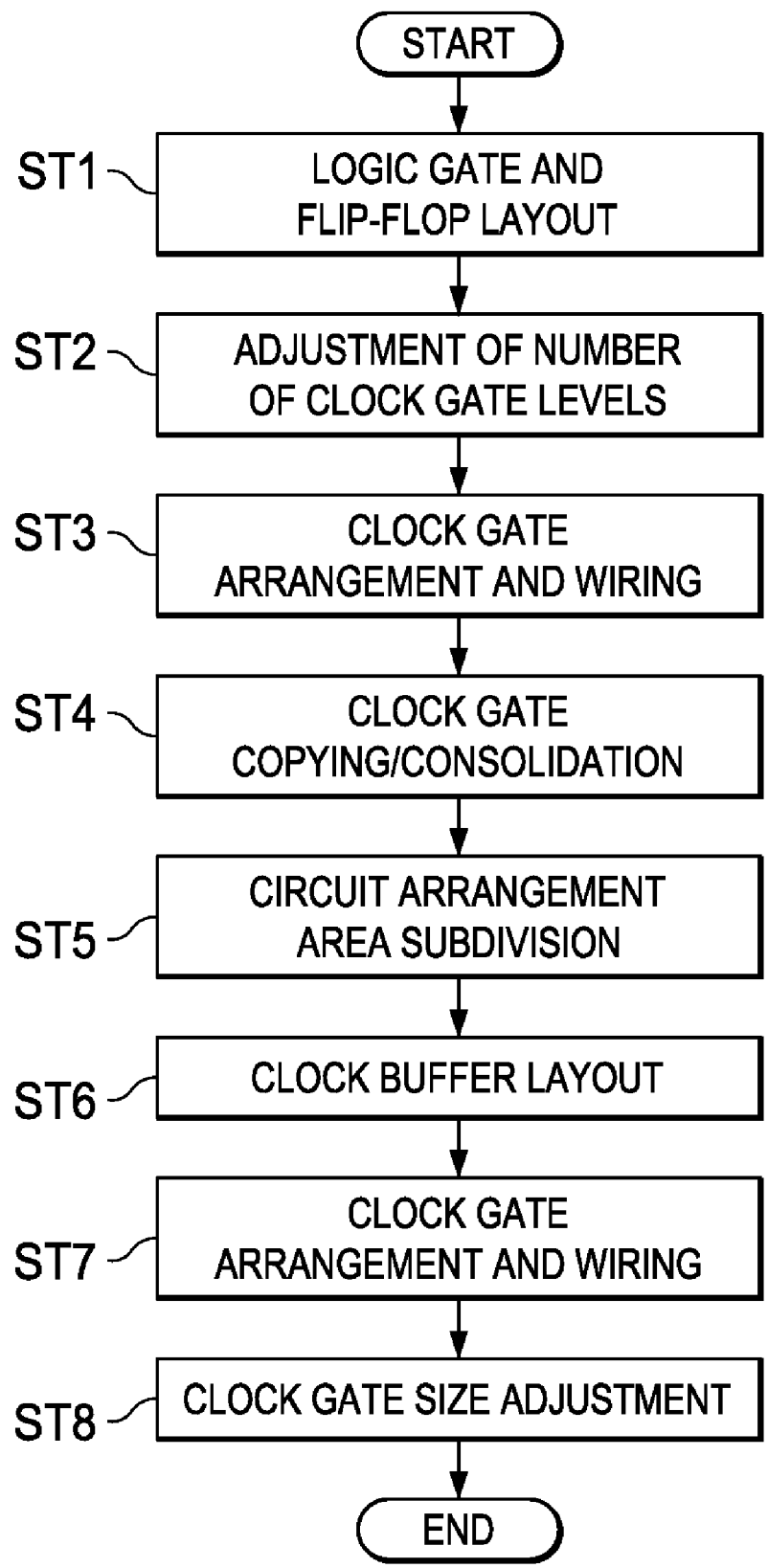
FIG. 3 is a flow chart showing an example of an integrated circuit device design method pertaining to an embodiment of the present invention.

FIG. 3 is a flow chart showing an example of an integrated circuit device design method pertaining to an embodiment of the present invention.

The integrated circuit device structure and design method will be explained following the flow in the flow chart shown in FIG. 3.

Logic Gate and FF Layout (Step ST1)

The layout of principal logic signal system circuit elements (FF, logic gates, etc.) is designed prior to CTB and ICG layout design.

Adjustment of Number of ICG Levels (Step ST2)

After logic signal system circuit layout has been determined, the ICG layout is designed.

In this embodiment, in order to set the number of ICG levels at 2, the number of ICG levels is adjusted prior to ICG layout design. That is, buffers are added in paths where the number of levels is insufficient so that the number of ICG levels will uniformly be 2 levels.

Figure 4A:
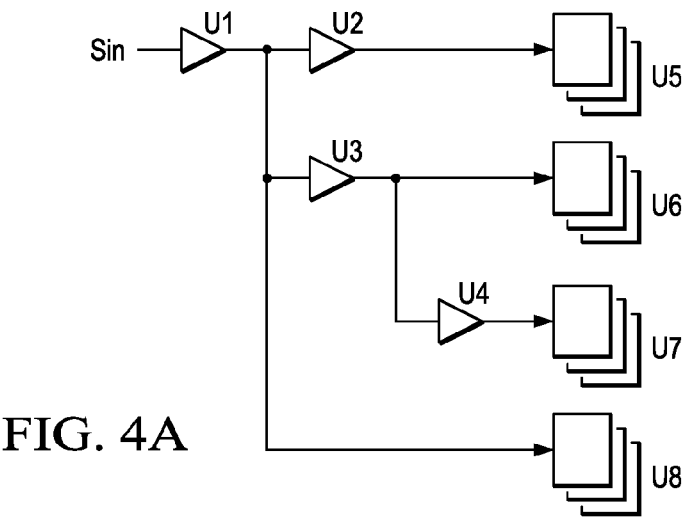
FIGS. 4A to 4C together illustrate an example of a method to adjust the number of clock gate levels.
Figure 4B:
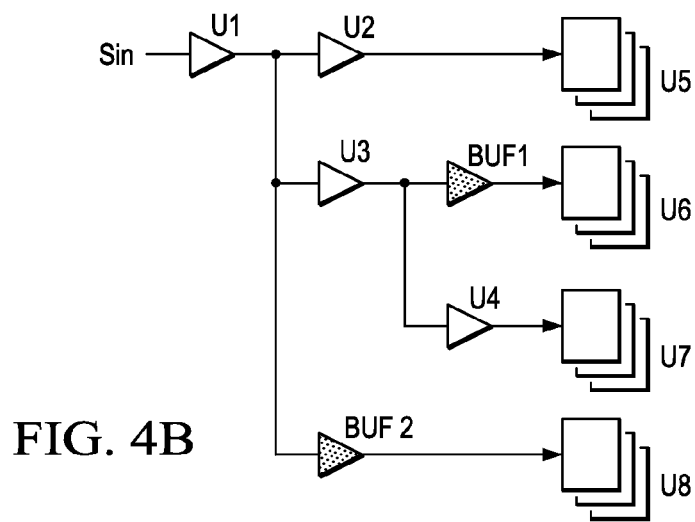
Figure 4C:
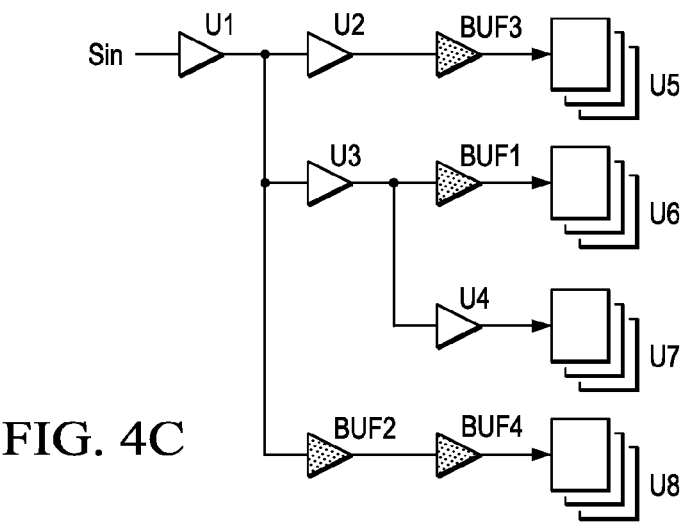

FIGS. 4A to 4C together illustrate an example of the method of adjusting the number of ICG levels.

In FIGS. 4A to 4C, "U1" represents CTB5; "U2" and "U3" represent ICG1; "U4" represents ICG2; and "U5"-"U8" represent FFs.

At the stage before the number of levels is adjusted (FIG. 4A), clock gates U2 and U3 and flip-flop U8 are connected to the level following clock buffer U1, flop-flop U5 is connected to the level following clock gate U2, clock gate U4 and flip-flop U6 are connected to the level following clock gate U3, and flop-flop U7 is connected to the level following clock gate U4.

With this number-of-levels adjustment method, first, CTBs or ICGs that drive both an FF and an ICG are searched for. In the example in FIG. 4A, clock gate U3 and clock buffer U1 correspond to this.

When the corresponding CTB or ICG is found, next, a buffer is inserted in place of the ICG on the FF drive path so as to not drive both the FF and the ICG. That is, with the example in FIG. 4B, a buffer BUF1 is inserted in the path connecting clock gate U3 and flip-flop U6, and a buffer BUF2 is inserted in the path connecting clock buffer U1 and flip-flop U8.

After there is no longer a CTB or ICG that drives both an FF and an ICG, next, the number of ICG levels furnished in all the FF clock propagation paths is checked. At this time, the abovementioned buffers (BUF1, BUF2) are also counted as ICGs. When there is a path where the number of levels is less than 2, a buffer is inserted in that path to set the number of levels at 2. With the example in FIG. 4C, a buffer BUF3 is inserted in the path connecting clock gate U2 and flip-flop U5, and a buffer BUF4 is inserted in the path connecting buffer BUF2 and flip-flop U8.

Here, the abovementioned adjustment of the number of ICG levels is not affected by the layout design in ST1, so the number of levels could be adjusted Prior to step ST1.

ICG arrangement and wiring (step ST3)

After adjustment of the number of clock gate levels has been completed, the ICGs are arranged and wired. ICG layout is preformed before and after CTB layout, for example. With this step (ST3) preformed before CTB layout, ICGs are arranged near the distribution center of the output side cells (fan-out). On the other hand, with step St7, described below, preformed after CTB layout, ICGs are arranged to be close to the input side cells(fan-in).

Figure 5A:
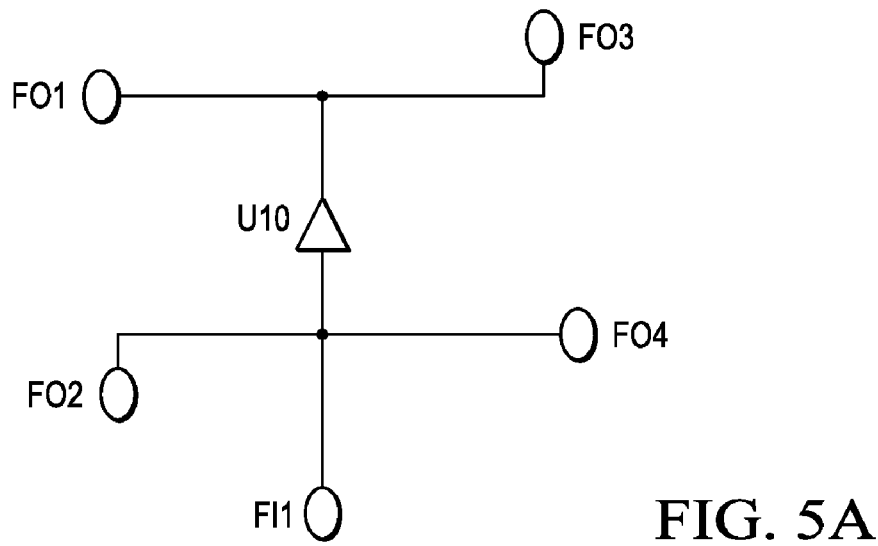
FIGS. 5A and 5B together illustrate an example of a clock gate arrangement.
Figure 5B:
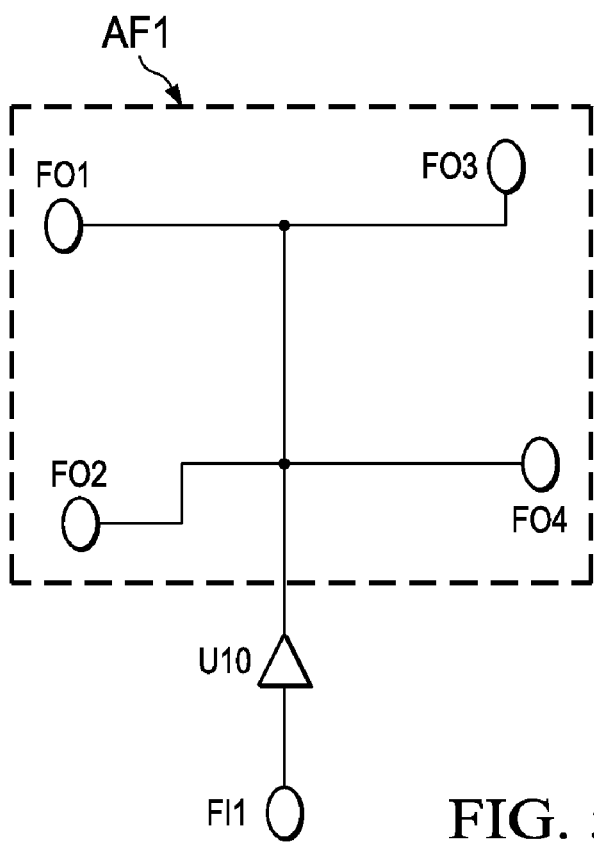

FIGS. 5A and 5B together illustrate an example of ICG arrangement.

"U10" in FIGS. 5A and 5B represents a clock gate (ICG). "FO1"-"FO4" represent circuit elements (FF or ICG) in the last level of clock gate U10. "F11" represents CTB5 (clock buffer at the terminus of the clock tree) positioned at a higher-order level with respect to clock gate U10. Clock gates (ICG) mentioned here also include buffers inserted at step ST2.

In this step, as shown in FIG. 5A, a clock gate U10 is disposed in the distribution center of circuit elements FO1-FO4. The distribution center is set, for example, at the center of gravity of circuit elements FO1-FO4. That is, when the position of each circuit element is represented with XY coordinates, the X coordinate of clock gate U10 is set at the average value of the X coordinates of circuit elements FO1-FO4, and the Y coordinate of clock gate U10 is set at the average value of the Y coordinates of circuit elements FO1-FO4.

The ICG arrangement is determined from the lowest-order level of clock gate (ICG2) in a bottom-up fashion. That is, first, ICG2 is arranged in the distribution center of the FF connected to the last level, and next ICG1 arranged in the distribution center of ICG2 connected to this last level.

ICG Copying/consolidation (Step ST4)

Following ICG arrangement and wiring. ICG copying is preformed. In this step, the load of each ICG (load capacitance of the driven circuit elements and wiring, etc.) is calculated, and when the calculation result exceeds a specified upper limit, the number of ICGs, driving them is increased while the arrangement of the circuit elements that are the load is maintained.

Figure 6A:
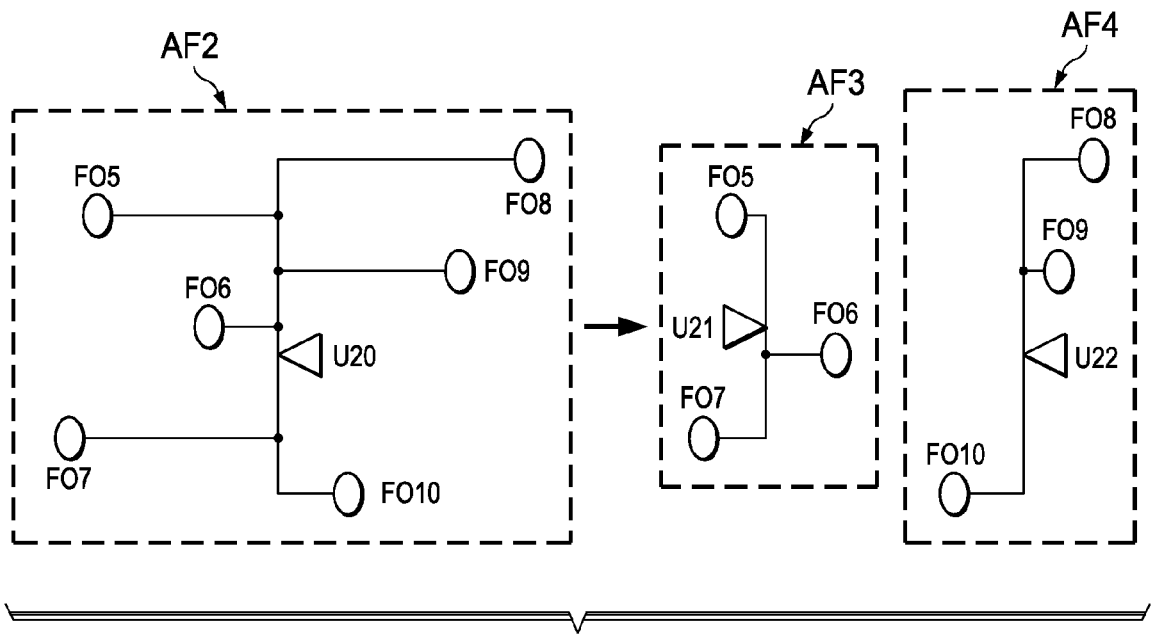
FIGS. 6A and 6B together illustrate a clock gate copying method.
Figure 6B:
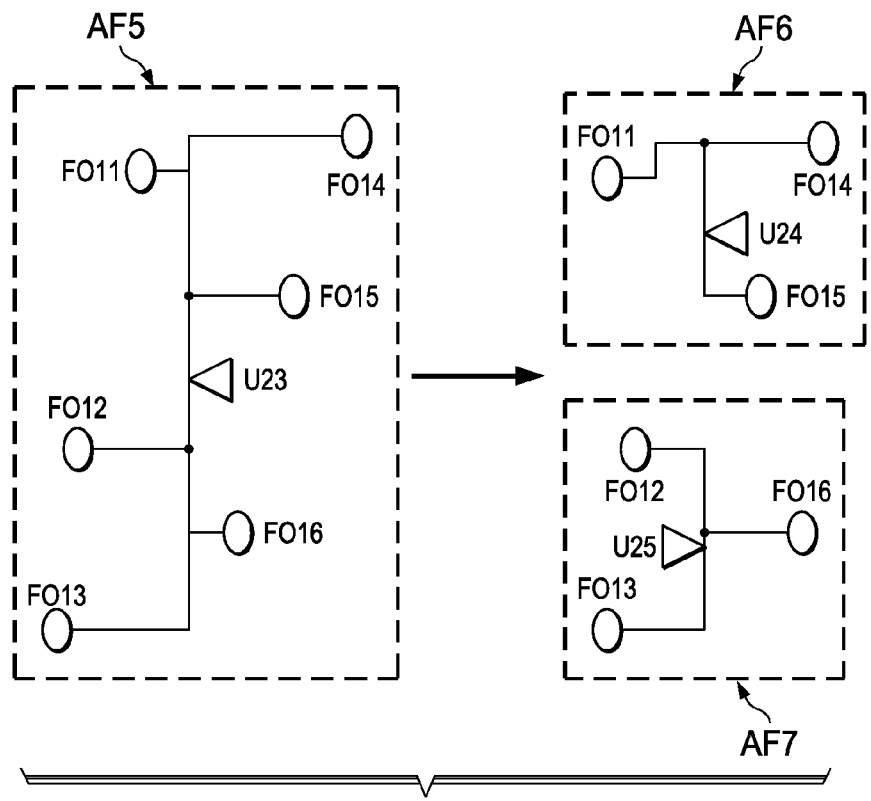

FIGS. 6A and 6B together illustrate an example of the ICG copying method.

In FIGS. 6A and 6B, "U20"-"U25" represent clock gates (ICG). "FO5"-"FO6" represent circuit elements (FF or ICG) in the last level of clock gates U20-U25. Clock gates (ICG) mentioned here also include buffers inserted at step ST2.

With the copying method shown in FIGS. 6A and 6B, the circuit elements are grouped according to the distribution state of the circuit elements (FF or ICG) in the last ICG level. First, the smallest quadrilateral area that includes all the circuit elements in the last ICG level is defined, and whether this quadrilateral area extends laterally or extends longitudinally is determined. If it extends laterally, the circuit elements in the last ICG level are divided into two groups to the left and right by dividing the quadrilateral area laterally so that the same number (or approximately the same number) of circuit elements is included in each (FIG. 6A). On the other hand, when the defined quadrilateral area extends longitudinally, the number of circuit elements is divided into two groups at the top and bottom by dividing the quadrilateral area longitudinally to include the same number (or approximate number) of circuit elements in each (FIG. 6B).

After this grouping, the arrangement of the ICGs driving each group is determined with the same method as in step ST3. That is, ICGs are arranged in the distribution centers of the circuit elements belonging to the groups.

In the example in FIG. 6A, 6 circuit elements FO5-FO10 are connected to the last level of clock gate U20, and the smallest quadrilateral area AF2 that includes them extends laterally. In this case, area AF2 is divided laterally to include 3 circuit elements each. The 6 circuit elements FO5-FO10 are divided into a left group (FO5, FO6, FO7) and a right group (FO8, FO9, FO10) by this division.

After grouping is performed, the distribution centers are determined for the left group and the right group, and clock gates U21 and U22 are arranged in the centers. Clock gate U21 drives left group circuit elements (FO5, FO6, FO7), and clock gate U22 drives right group circuit elements (FO8, FO9 and FO10).

In the example in FIG. 6B, 6 circuit elements FO11-FO16 are connected to the last level of clock gate U23, and the smallest quadrilateral area AF5 that includes them extends longitudinally. In this case, area AF5 is divided longitudinally to include 3 circuit elements each. The 6 circuit elements FO11-FO16 are divided into a top group (FO11, FO14, FO15) and a bottom group (FO12, FO13, FO16) by this division.

After grouping, the distribution centers are determined for the top group and the bottom group, and clock gates U24 and U25 are arranged in the centers. Clock gate U24 drives the top group circuit elements (FO11, FO14, FO15), and clock gate U25 drives the bottom group circuit elements (FO12, FO13 and FO16).

When the ICG load is larger than a specified upper limit, the number of ICGs is increased using the copying described above, and conversely, when the ICG load is small, the number is decreased by consolidating ICGs.

For example, when 2 ICGs that have a common circuit element in a high-order level each drive circuit element groups distributed in adjacent areas, and the total value of the loads of the 2 ICGs is smaller than a specified lower limit value, said 2 ICGs are consolidated into 1 ICG. The two circuit element groups driven by said 2 ICGs are driven by the consolidated 1 ICG. The arrangement of consolidated ICGs is determined with the same method as step ST3 based on the distribution of the circuit element groups that are the load.

ICG copying and consolidation is performed in a bottom-up fashion from the clock gate in the bottom-most level (ICG2), for example.

Subdivision of Circuit Arrangement Areas (Step ST5)

When the ICG layout has been determined at steps ST2-ST4, next, the layout of the CTBs that constitute the clock tree is designed.

In the integrated circuit device pertaining to this embodiment, CTBs are arranged based on the distribution of ICG1s (first level clock gates). First, the circuit arrangement area A1 of the ICG1s is defined, and circuit arrangement area A1 is sectioned into multiple areas that include approximately the same number of ICG1s. Then, one CTB5 (clock buffer at the terminus of the tree structure) is arranged per each sectioned area. CTB5 supplies a clock signal to each ICG1 included in the arranged areas.

Figure 7:
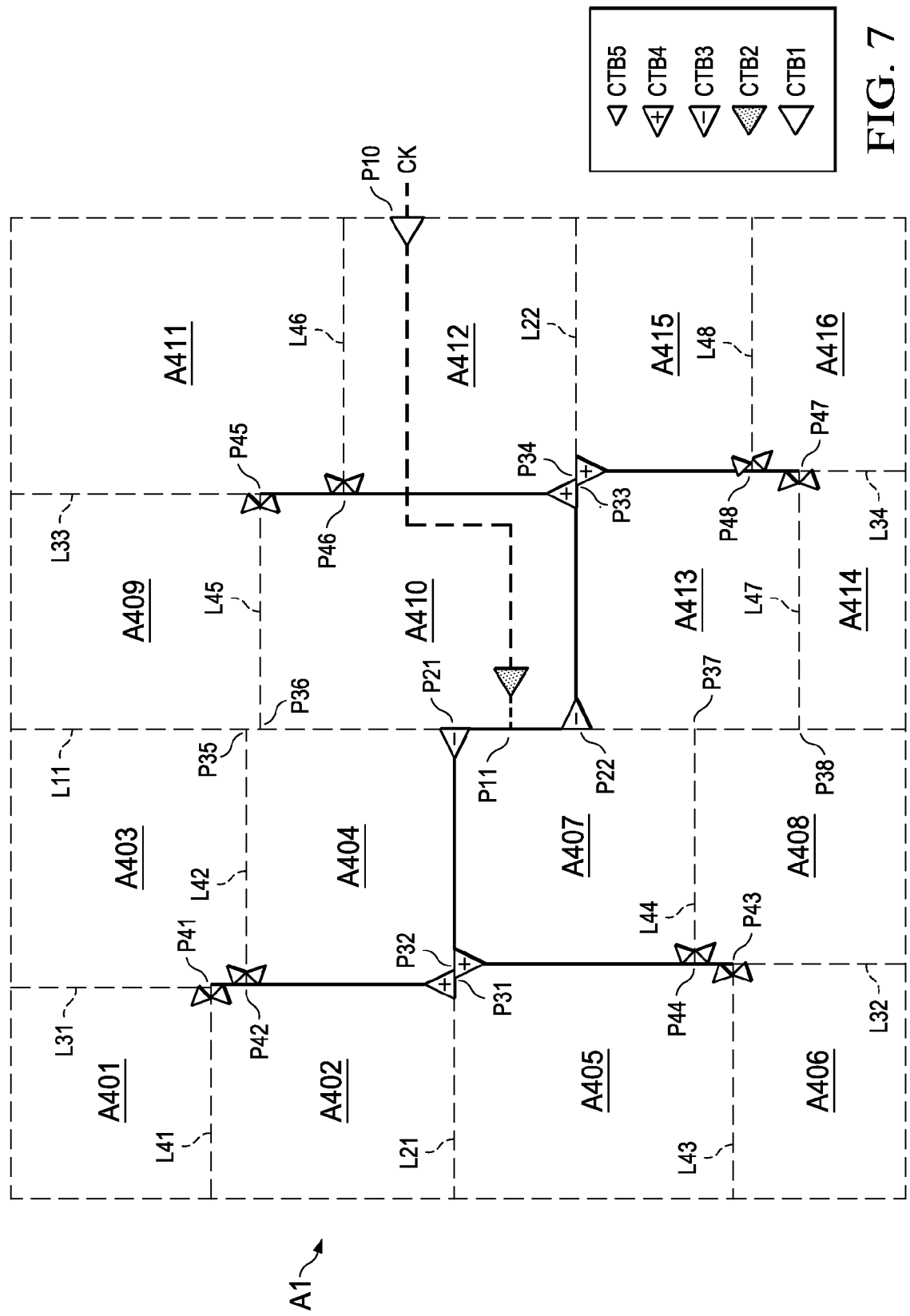
FIG. 7 illustrates an example of 16 areas subdivided from the clock gate circuit arrangement area, and the arrangement of clock buffers determined based on the division of the areas.
Figure 8A:
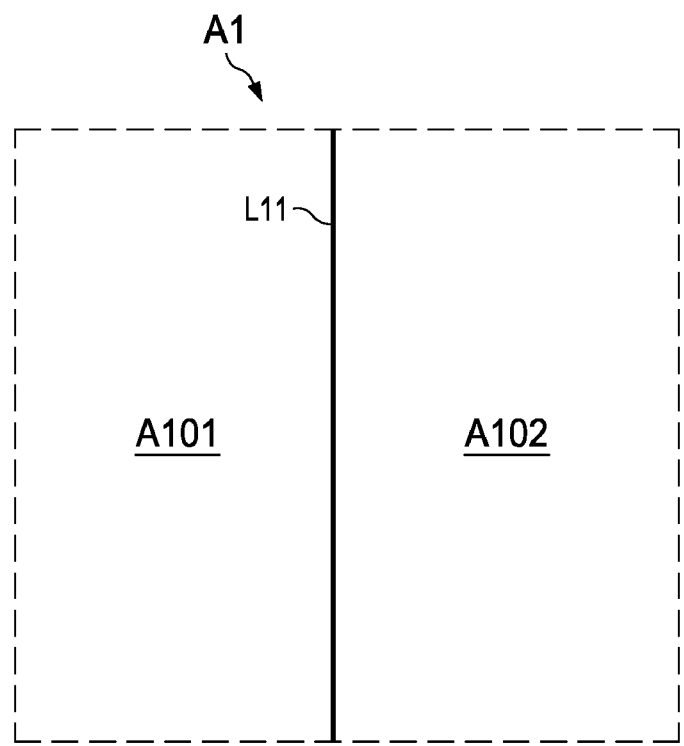
FIGS. 8A to 8D together illustrate an example of a circuit arrangement area subdivision method.
Figure 8B:
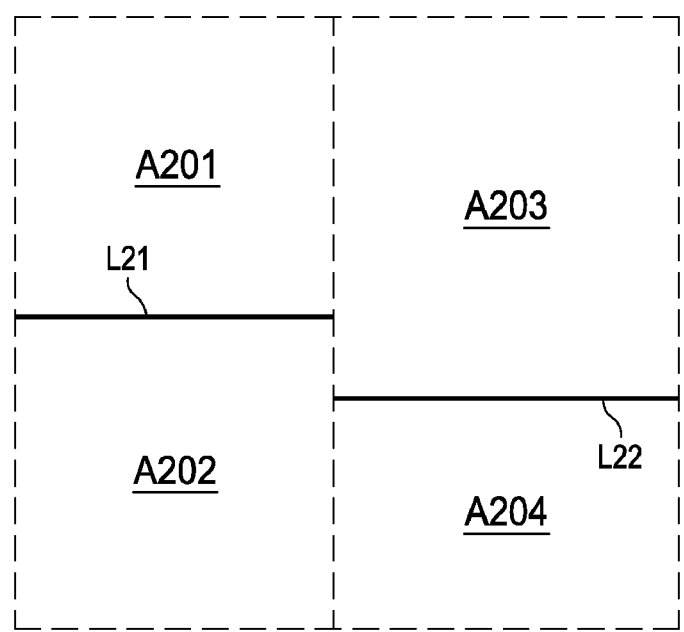
Figure 8C:
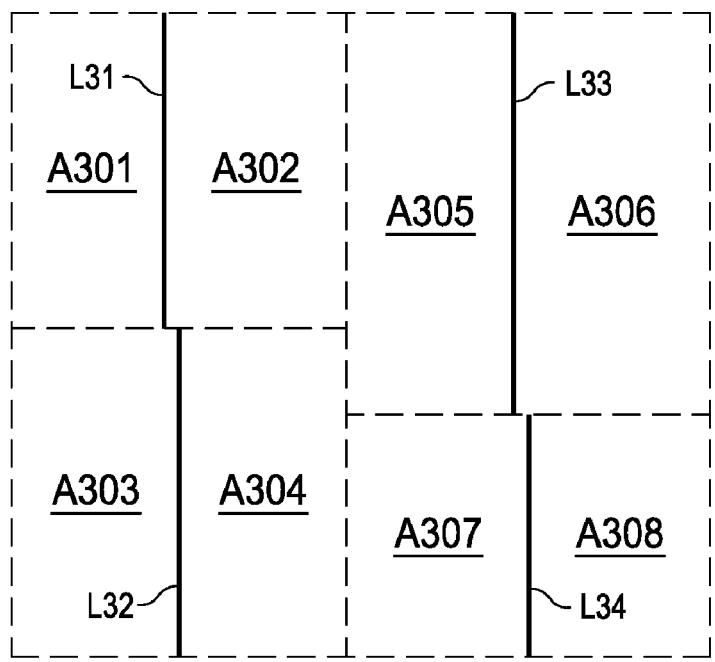
Figure 8D:
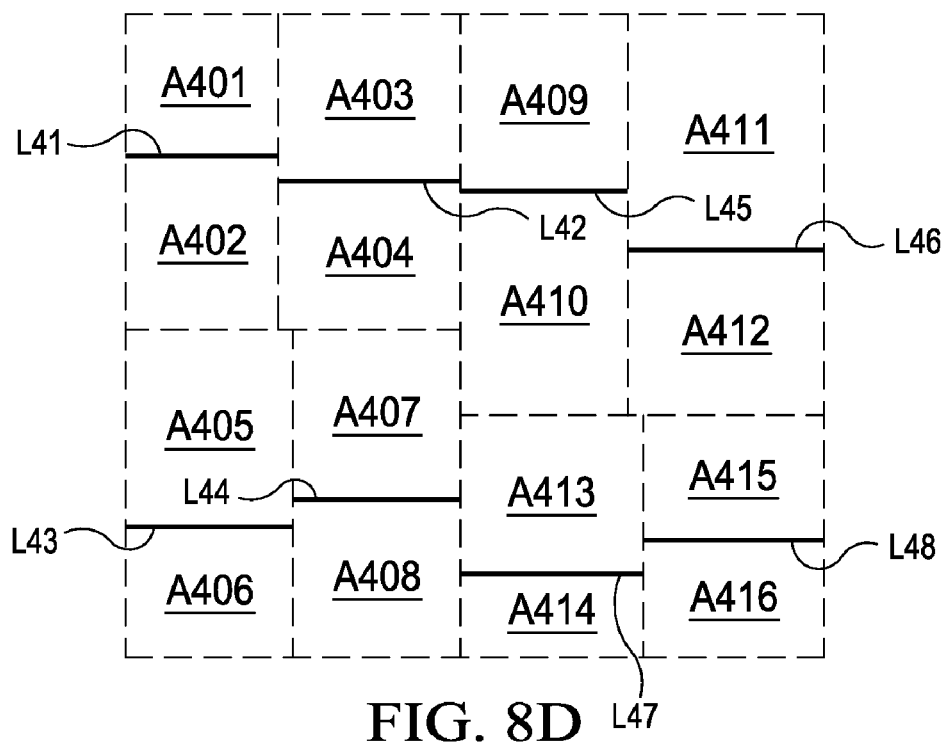

FIG. 7 is a figure illustrating an example of 16 areas A401-A416 subdivided from circuit arrangement area A1 and the CTB arrangement determined based on the sectioning of the areas.

Circuit arrangement area A1 is defined as the smallest quadrilateral area that contains all of the ICG1s inside it, for example. The direction (longitudinal or lateral) of the sides of the quadrilateral can be defined arbitrarily, and is defined in the direction in which wiring can be formed on a semiconductor chip, for example. Areas A401-A416 are defined as the areas where circuit arrangement area A1 is divided into 16 so that the number of ICG1s included in each will be approximately equal (that is, will be approximately equal to 1/16 of the number of all the ICG1s). As shown in FIG. 7, one CTB5 each is arranged in each area A401-A416, and ICG1s in each area are driven by the CTB5 arranged in that area.

Here, area A1 is an embodiment of the first area in the present invention.

Areas A401-A416 are embodiments of the second area in the present invention.

FIGS. 8A to 8D together illustrate an example of a subdivision method for circuit arrangement area A1.

In this subdivision method, subdivision that divides a higher-order section into 2 lower-order sections with a section line that extends longitudinally or laterally is repeated in stages. With the example in FIGS. 8A to 8D, circuit arrangement area A1 is sectioned into 16 areas A401-A416 by four repetitions of subdivision that divides a higher-order section into 2 lower-order sections. At each stage of subdivision, the higher-order section is divided so that the 2 lower-order sections include approximately the same number of ICG1s, so approximately the same number of ICG1s are included in the 16 areas A401-A416 that are ultimately obtained.

First, with the first stage of subdivision (FIG. 8A), circuit arrangement area A1 is laterally divided into two with section line L11 that extends longitudinally. Area A1 is divided into areas A101 and A102 by this. Section line L11 is established so that approximately the same number of ICG1s is included in areas A101 and A102.

With the second stage of subdivision (FIG. 8B), the two areas A101 and A102 obtained with the first stage of subdivision are longitudinally divided into two with section lines L21 and L22, respectively, that extend laterally. Area A101 is divided into areas A201 and A202, and area A102 is divided into areas A203 and A204 by this. Section lines L21 and L22 are set so that approximately the same number of ICG1s is included in areas A201 and A202, and areas A203 and A204, respectively.

With the third stage of subdivision (FIG. 8C), the 4 areas A201-A204 obtained with the second stage of subdivision are laterally divided into two with section lines L31-L34, respectively, that extend longitudinally. Area A201 is divided into areas A301 and A302, area A202 is divided into areas A303 and A304, area A203 is divided into areas A305 and A306, and area A204 is divided into areas A307 and A308 by this. Section lines L31, L32, L33 and L34 are established so that approximately the same number of ICG1s is included in areas A301 and A302, areas A303 and A304, areas A305 and A306, and areas A307 and A308, respectively.

With the fourth stage of subdivision (FIG. 8D), the 8 areas A301-A308 obtained with the third stage of subdivision are longitudinally divided into two with section lines L41-L48, respectively, that extend laterally. Area A301 is divided into areas A401 and A402, area A302 is divided into areas A403 and A404, area A303 is divided into areas A405 and A406, area A304 is divided into areas A407 and A408, area A305 is divided into areas A409 and A410, area A306 is divided into areas A411 and A412, area A307 is divided into areas A413 and A414, and area A308 is divided into areas A415 and A416 by this. Section lines L41, L42, L43, L44, L45, L46, L47 and L48 are established so that approximately the same number of ICG1s are included in areas A401 and A402, areas A403 and A404, areas A405 and A406, areas A407 and A408, areas A409 and A410, areas A411 and A412, areas A413 and A414, and areas A415 and A416, respectively.

Clock Buffer Layout (Step ST6)

When circuit arrangement area A1 has been subdivided, next, the arrangement and wiring of each CTB that constitutes the clock tree are determined based on the sectioning of the area.

The CTBs serving as structured buffers (CTB3, CTB4, CTB5) are basically arranged at the edges of the areas sectioned at step ST5 (A401-A416). The wiring that connects the CTBs can be formed along the edges of the areas by arranging the CTBs at the edges of the sectioned areas. If wiring is formed at the edges of the sectioned areas, mixing with other clock signal system wiring connected to the circuit elements in the sectioned areas is avoided. Since it is not necessary to detour the CTB wiring by avoiding other clock signal system wiring, the CTB wiring can be easily formed in a straight line, and increased load capacitance is suppressed. The frequency at which the CTB wiring is carried over to other layers is also reduced, so an increase in load capacitance is also suppressed from this aspect, while the number of connection holes (vias) for carrying over to other layers can be reduced, leading to suppression of RC delay.

The CTBs serving as structured buffers (CTB3, CTB4, CTB5) are also preferably arranged adjacent to points of intersection where 2 or more section lines cross (hereafter, a point of intersection of section lines may simply be referred to as a "point of intersection"). Because the structured buffers are at branch points of the clock tree, by arranging them adjacent to section line points of intersection, it is easy to form common wiring for multiple structured buffers that branch in a straight line along the side of a sectioned area, and the wiring distance will be shorter.

In still another embodiment, CTB5 positioned at the terminus of the tree structure is disposed adjacent to a point of intersection of lower-most section lines (L41-L48) and 1 or more higher-order section lines (L31-L34) in the subdivision explained at step ST5. Then CTB3 and CTB4 positioned at a higher level than CTB5 are arranged adjacent to the point of intersection of a section line having a point of intersection adjacent to the next level CTB in the tree structure and a higher-order section line than said section line. That is, the higher-level CTBs in the tree structure are arranged at the points of intersection of higher-order section lines in the subdivision. Because of this, going higher in the tree structure, CTBs are concentrated in the center part of circuit arrangement area A1, so the CTB wiring will be compact.

FIGS. 9A to 9E together illustrate an example of a CTB arrangement method.

First, the points of intersection (P41-P48) of bottom-most section lines (L41-L48) and section lines (L31-L34) of one order higher in the subdivision in step ST5 are specified. In the example in FIG. 9A, section lines L31, and L41 and L42 cross at points of intersection P41 and P42, respectively. Section lines L32, and L43 and L44 cross at points of intersection P43 and P44, respectively. Section lines L33, and L45 and L46 cross at points of intersection P45 and P46, respectively. Section lines L34, and L47 and L48 cross at points of intersection P47 and P48, respectively.

The CTB5 in each sectioned area is disposed adjacent to P41-P48 that is specified (FIG. 9B). That is, CTB5s of areas A401 and A402 are arranged adjacent to point of intersection P41, CTB5s of areas A403 and A405 to point of intersection P42, CTB5s of areas A405 and A406 to point of intersection P43, CTB5s of areas A407 and A408 to point of intersection P44, CTB5s of areas A409 and A410 to point of intersection P45, CTB5s of areas A411 and A412 to point of intersection P46, CTB5s of areas A413 and A414 to point of intersection P47, and CTB5s of areas A415 and A416 to point of intersection P48.

Next, the points of intersection of the section lines (L41-L48, L31-L34) having points of intersection adjacent to a CTB5 (P41-P48) and a higher-order section than these section lines are specified as the points of intersection where a CTB4 is arranged. In the example in FIG. 9B, section line L31 crosses at point of intersection P31 with higher-order section line L21, section line L32 crosses at point of intersection P32 with higher-order section line L21, section line L33 crosses at point of intersection P33 with higher-order section line L22, section line L34 crosses at point of intersection P34 with higher-order section line L22, section line L42 crosses at point of intersection P35 with higher-order section line L11, section line L45 crosses at point of intersection P36 with higher-order section line L11, section line L44 crosses at point of intersection P37 with higher-order section line L11, and section line L47 crosses at point of intersection P38 with higher-order section line L11.

Here, a CTB4 can be arranged at each of the 8 points of intersection specified (P31-P38). In this case, the number of CTB4s will be 8. On the other hand, if 4 CTB5s can be driven by each CTB4, the number of CTB4s could be 4. In the latter case, the 4 points of intersection are selected from the above 8 points of intersection.

Figure 10:
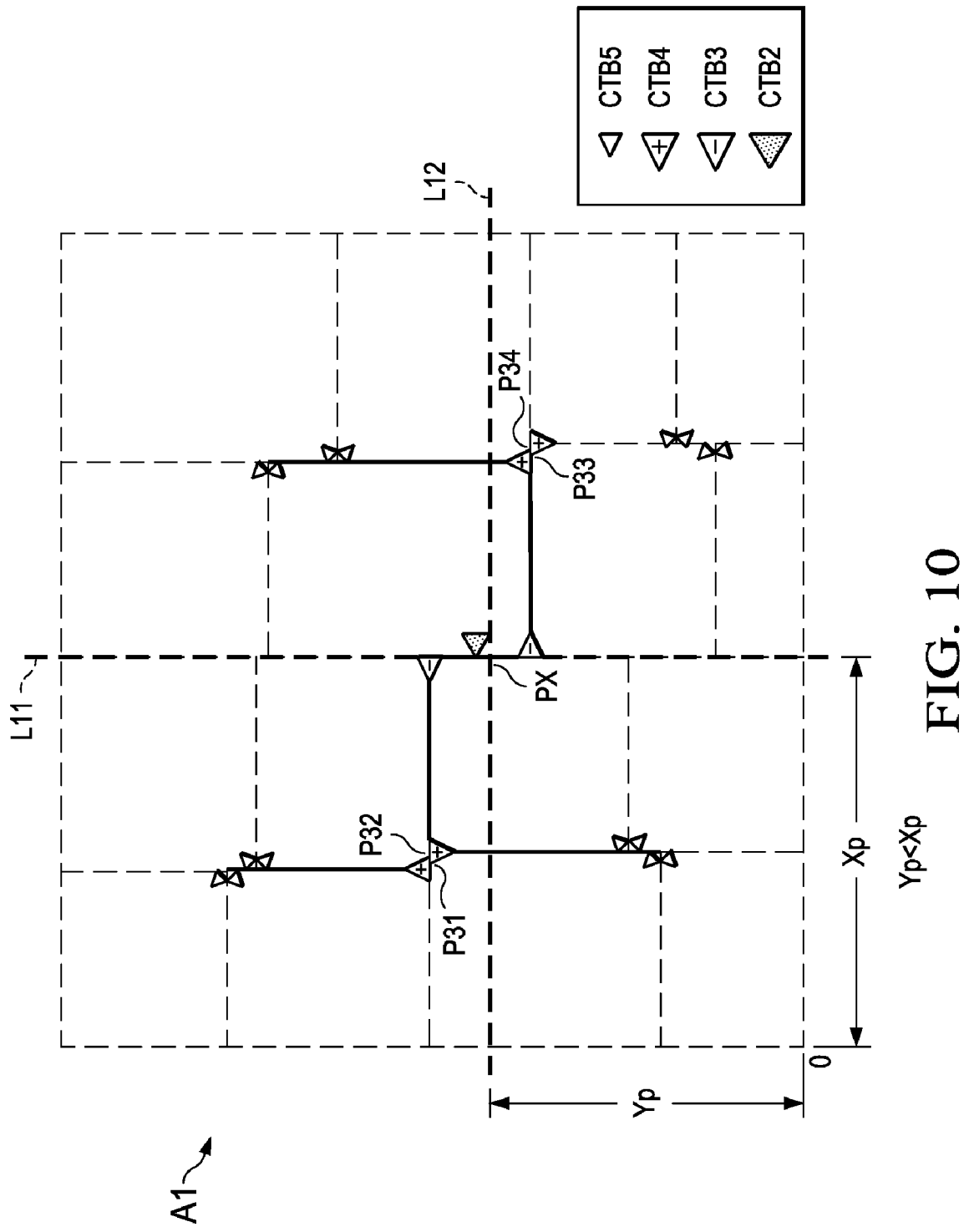
FIG. 10 is a first figure explaining an example of a method of selecting points of intersection where clock buffers are disposed.
Figure 11:
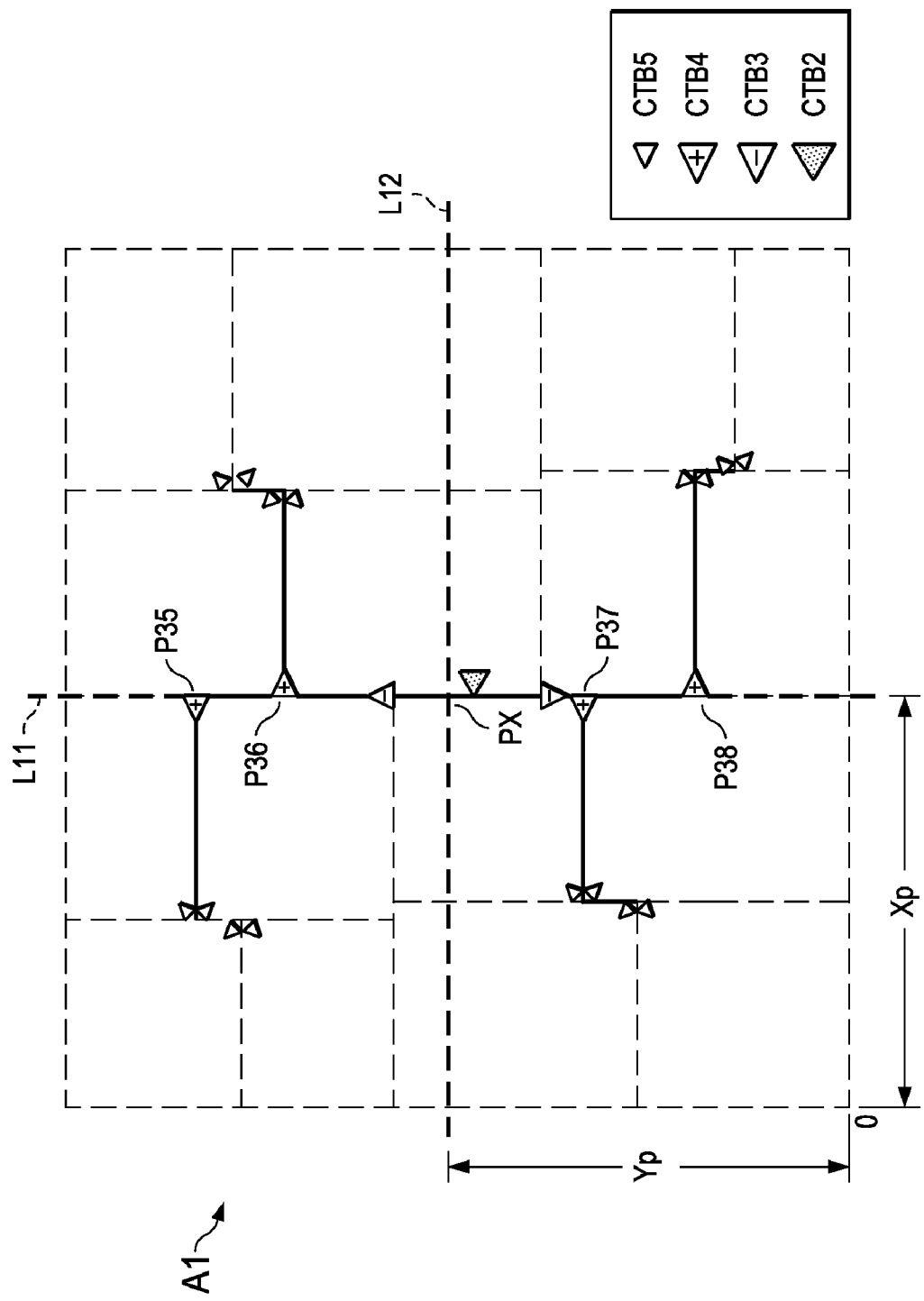
FIG. 11 is a second figure explaining an example of a method of selecting points of intersection where clock buffers are disposed.

FIG. 10 and FIG. 11 are figures illustrating examples of the selection method for 4 points of intersection where CTB4s are arranged.

With this method, first, the point of intersection PX of section line L11 that divides circuit arrangement area A1 into 2 longitudinally and section line L12 that divides it into 2 laterally is specified. Section lines L11 and L12 are each established so that the number of ICG1s included in the 2 areas that are divided is approximately the same.

When point of intersection PX has been specified, next, using an appropriate corner of circuit arrangement area A1 as origin O, the coordinates (Xp, Yp) of point of intersection PX relative to origin O are acquired. Then, based on the coordinates, whether distance Xp in the lateral direction or distance Yp in the longitudinal direction from origin O is shorter is determined. With the example in FIG. 10, distance Yp in the longitudinal direction is shorter than distance Xp in the lateral direction (Yp<Xp), and with the example in FIG. 11, distance Xp in the lateral direction is shorter than distance Yp in the longitudinal direction (Xp<Yp).

When the distance in the longitudinal direction is shorter (Yp<Xp), the point of intersection of a lower-order section line extending longitudinally and a higher-order line extending laterally is selected as the point of intersection where CTB4 will be disposed. With the example in FIG. 9C, points of intersection P31-P34 are selected.

On the other hand, when the distance in the lateral direction is shorter (Xp<Yp), the point of intersection of a lower-order section line extending laterally and a higher-order line extending longitudinally is selected as the point of intersection where CTB4 will be disposed. With the example in 9C, points of intersection P35-P38 are selected.

In this way, the distance in the longitudinal direction and the distance in the lateral direction from origin O to point of intersection PX are compared, and a CTB4 is disposed at the point of intersection of a lower-order section line extending in the direction in which the distance is shorter. For this reason, the length of wiring extending from CTB4 to CTB5 will be shorter, and the load capacitance driven in CTB4 is reduced.

Figure 9D:
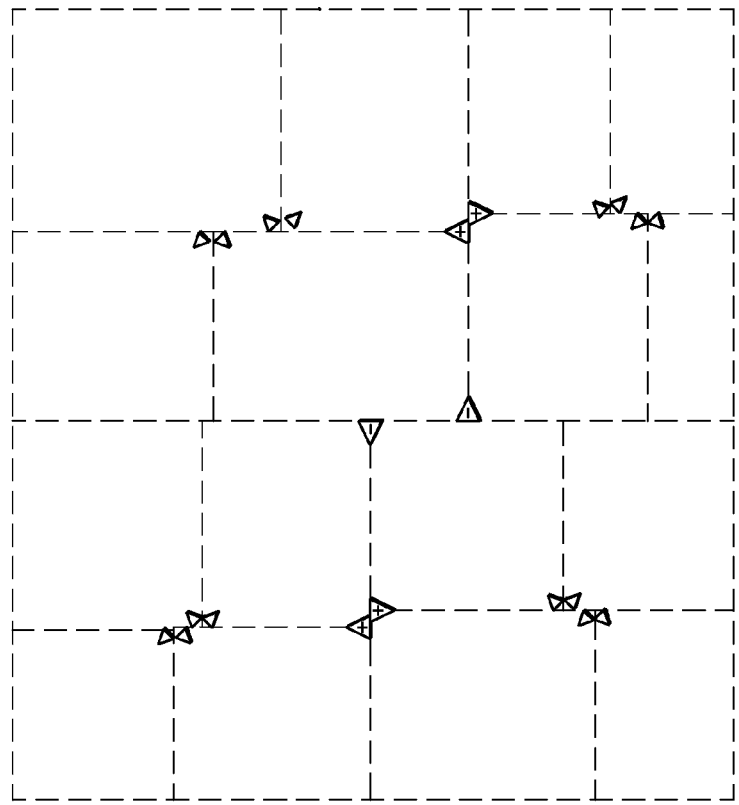
Figure 9C:
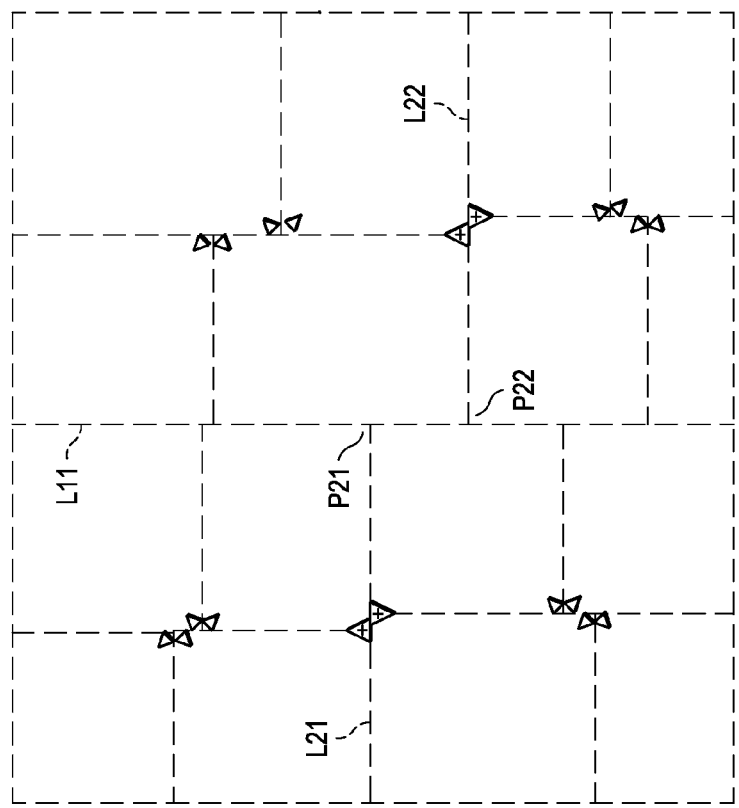

When the arrangement of CTB4s has been determined, next the arrangement of CTB3s is determined. CTB3s are arranged at the points of intersection of section lines (L31-L34, L21, L22) that have a point of intersection (with the example in FIG. 9C, P31-P34) adjacent to a CTB4 in the next level, and a higher-order section line than these section lines. In the example in FIG. 9C, section line L21 crosses at point of intersection P21 with higher-order section line L11, and section line L22 crosses at point of intersection P22 with higher-order section line L11. CTB3s are arranged at points of intersection P21 and P22 (FIG. 9D).

Figure 9E:
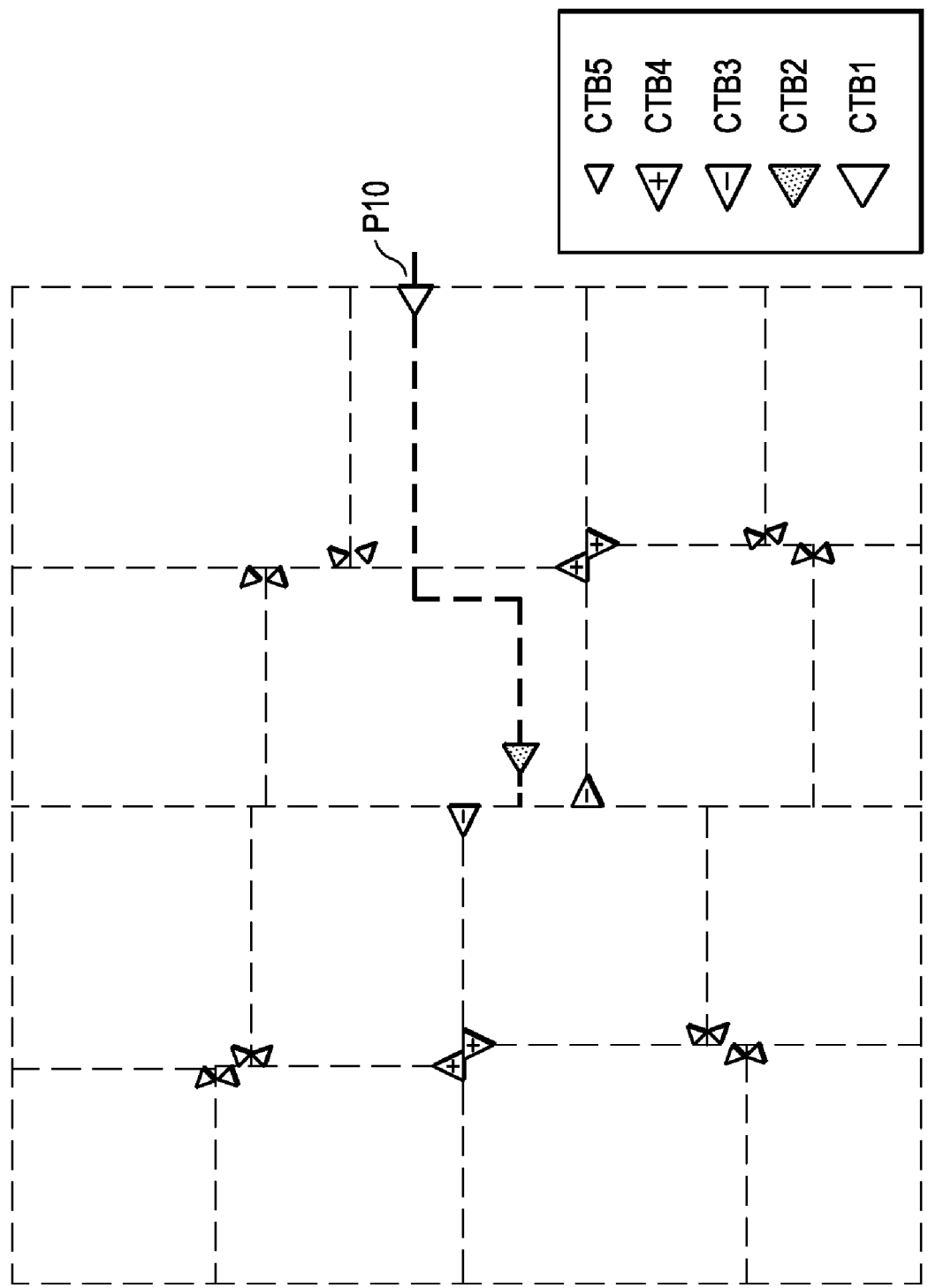

When the arrangement of CTB3s has been determined, next the arrangement of CTB1 and CTB2 is determined. CTB1 and CTB2 are arranged on wiring that connects 2 CTB3s with starting point P10 of the clock tree (FIG. 9E). This wiring is formed, for example, so that the Manhattan distance from starting point P10 to the 2 CTB3s will be shortest, and the length of the lines that branch to the 2 CTB3s will also be shortest. CTB1 and CTB2 that serve as repeaters are arranged so that the size of their load (load capacitance, etc.), for example, is included in a specified range.

After the arrangement of the CTBs in the clock tree has been determined with the above, the wiring that connects the CTBs is formed. The CTB wiring is formed along the edges of the sectioned areas (A401-A416) so that its length will be minimized.

ICG Arrangement and Wiring (Step ST7)

When CTB5 arrangement is determined at step ST6, the ICGs provisionally arranged at step ST3 are again arranged using the CTB5s as reference, and wiring is also re-formed based on their arrangement.

At step ST7, ICGs are arranged to be close to the input side cells (fan-in). FIG. 5B shows an example of this arrangement.

As shown in FIG. 5B, clock gate U10 is arranged at the side closest to clock buffer F11 (CTB5) at a terminus of the clock tree positioned higher than clock gate U10, in the smallest quadrilateral area AF1 that includes last-level circuit elements FO1-FO4.

With this arrangement method, first, the smallest quadrilateral area AF1 that includes last-level circuit elements FO1-FO4 of clock gate U10 is defined.

When area AF1 is determined, the side of area AF1 closest to clock buffer F11 (CTB5) is selected from the 4 sides of area AF1. Clock gate U10 is disposed, for example, at any position on the side selected (the center, for example), or at the closest position to clock buffer F11 on that side.

Clock gate U10 shown in the example in FIG. 5 is an ICG1 (first level clock gate), but the side closest to higher-level clock buffer F11 (CTB5) is also selected when it is an ICG2.

The ICG arrangement is determined in a bottom-up fashion from the lowest level clock gate (ICG2). That is, first, for the ICG2, the smallest quadrilateral area that includes the FFs connected to the last level is defined, and of its 4 sides, the ICG2 is disposed on the side closest to the higher-level CTB5. Next, for the ICG1, the smallest quadrilateral area that includes the ICG2 connected to the last level is defined, and of the 4 sides, the ICG1 is disposed on the side closest to the higher-level CTB5.

After ICG arrangement has been determined as described above, wiring to connect the ICGs is formed. The wiring is formed, for example, to connect the ICG output and its fan-out in the shortest distance.

Clock Gate Size Adjustment (Step ST8)

Figure 12:
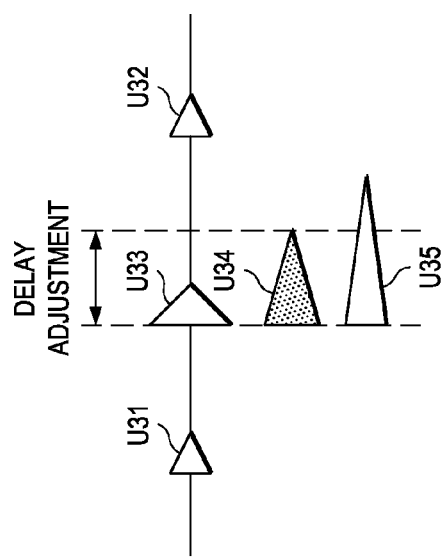
FIG. 12 is a figure explaining clock gate size adjustment.

After CTB and ICG layout has been determined with the above, the ICG size (drive capability) is adjusted in order to adjust skew (variation in clock signal arrival time) in each FF. FIG. 12 is a figure for explaining ICG size adjustment. In FIG. 12, "U31" represents a CTB or ICG, and "U32" represents an ICG or FF. "U33"-"U35" represent ICGs inserted between "U31" and "U32". As shown in FIG. 12, the size of the ICGs (including buffers inserted at step ST2) can be selected, for example, from several types, and the ICG size is selected to adjust delay between "U31" and "U32". Skew in each FF is kept in a specified range by appropriately performing such delay adjustment.

As explained above, with these embodiments, ICG1 circuit arrangement area A1 is sectioned into multiple areas that include approximately the same number of ICG1s. Then a CTB5 (CTB at a clock tree terminus) is disposed one each in each sectioned area. The CTB5 disposed in each sectioned area supplies a common clock signal to the ICG1s included in the area where it is disposed.

By making the CTBs (CTB5) fan-out at the clock tree termini approximately equal in this way, the size of their loads will approximate each other, so although the number of CTBs is significantly reduced compared to clock tree synthesis with an ordinary EDA tool, clock signal skew in the FFs can be kept very small.

The clock signal frequency is the signal with the highest frequency in an integrated circuit device, and the power consumption required to drive it occupies a large proportion of the power consumption by the integrated circuit device. With this embodiment, power consumption relating to clock signal driving can be reduced by significantly reducing the number of CTBs, so it can contribute greatly to lower power consumption by the integrated circuit device.

Variation in clock signal delay time produced by variation in circuit element characteristics due to the manufacturing process can also be reduced by reducing the number of CTBs.

Also with these embodiments, more CTBs (CTB5s) at the termini of the clock tree will be arranged in places of high distribution density, according to the two-dimensional distribution density of the ICG1s, which are the directly driven objects in the clock tree, so while the loads of the CTBs at the clock tree termini will approximate each other, the wiring distance between the clock tree terminus CTBs and ICG1s can be maximally shortened. Because of this, the overall wiring distance from the clock tree termini to the FFs will be shorter, and differences in load in the CTBs at the clock tree termini will be relatively small, so FF skew can be reduced. Wiring relating to clock signal propagation will also be reduced overall, so this can contribute to lowered power consumption.

In addition, with these embodiments, the clock signal system layout can be designed after the logic signal system circuit element (FF, logic gates, etc.) layout is designed, so the layout of the logic signal system is not subjected to restrictions by the layout of the clock signal system as in an H tree structure or mesh structure.

Also with these embodiments, the number of CTB levels from the starting point to the termini of the clock tree is uniformly the same, so the propagation time of the clock signal from the starting point of the clock tree to each FF will be uniform, and clock signal skew in the FFs can be reduced.

In addition, with these embodiments, it is possible to form the CTB wiring along the edges of the sectioned areas by arranging the CTBs serving as structured buffers (CTB3, CTB4, CTB5) at the edges of the sectioned areas (A401-A416). Because of this, it is easy to form the CTB wiring in a straight line, and increased CTB load capacitance can be suppressed. The clock signal delay time will be shorter due to the wiring load capacitance being smaller, and skew can be relatively reduced. Power consumption can also be reduced since load current is smaller due to the capacitance being smaller.

Furthermore, because the CTBs serving as structured buffers (CTB3, CTB4, CTB5) are arranged adjacent to the points of intersection of section lines, it is easy to form common wiring for multiple structured buffers that branch along the sides of the sectioned areas in a straight line, and the wiring distance can be reduced.

Also each ICG present between the clock tree and an FF, is disposed on the side closest to the CTB at the clock tree terminus positioned in the higher-order level, in the smallest quadrilateral area that includes the group of circuit elements at that last level. Because of this, because each ICG is disposed to be aggregated toward a CTB at a clock tree terminus, the wiring connecting the CTBs and ICGs will be shorter overall. The result is that the wiring load capacitance will be smaller, and the power consumption accompanying clock signal driving can be effectively reduced.

Several embodiments of the present invention were explained above, but the present invention is not limited to the embodiments described above and includes a number of variations.

With the embodiments described above, examples wherein the circuit arrangement area is divided into 16 were explained, but the present invention is not limited to this. The number of divisions of the circuit arrangement area can be determined according to the number of fan-outs that are possible in the CTBs at the clock tree termini, for example, so the number of divisions could be more or less than 16.

Also with the embodiments, the areas at each stage of subdivision of the circuit arrangement area are divided into 2, but the present invention is not limited to this. That is, they could also be divided into any number greater than 2 at each stage of subdivision.

Figure 13:
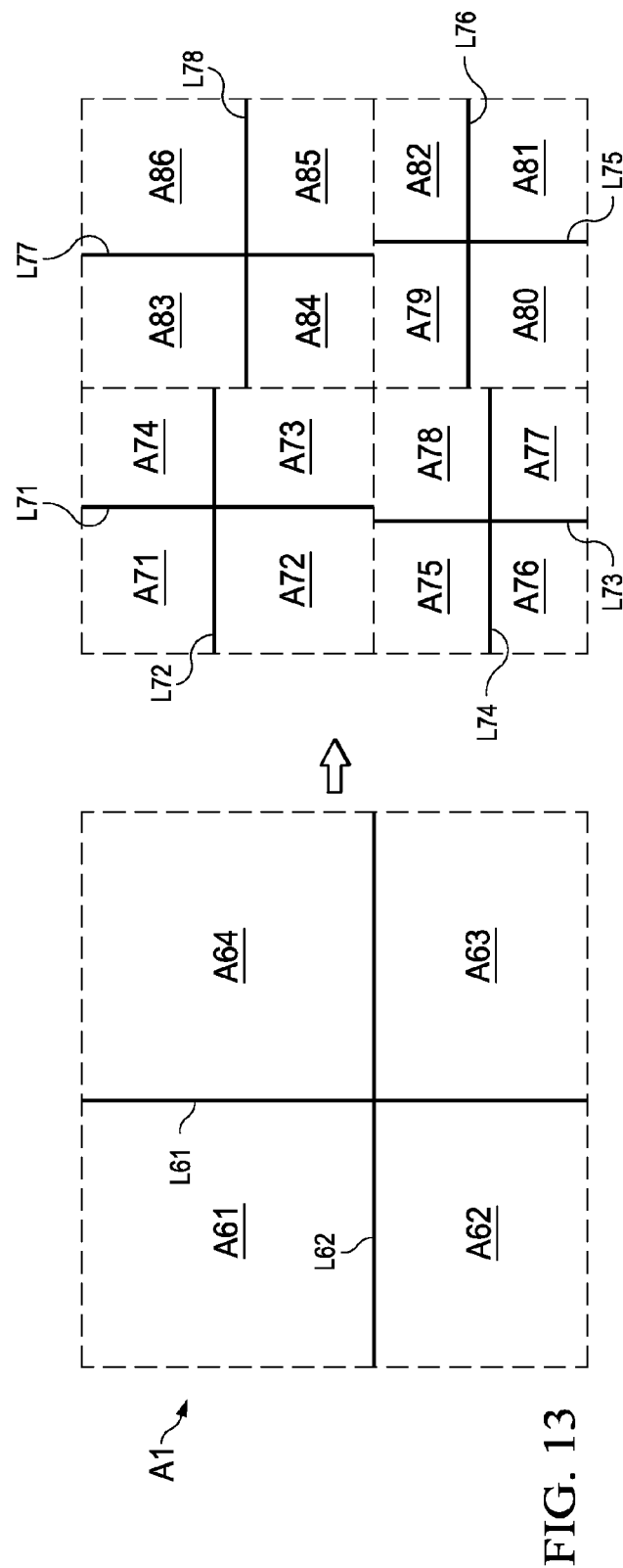
FIG. 13 is a figure explaining a variation of the circuit arrangement area subdivision method.

With the example in FIG. 13, for example, the circuit arrangement area is divided into 4 by section line L61 that laterally divides the circuit arrangement area into 2 and by section line L62 that longitudinally divides it into 2, and the circuit arrangement area is ultimately divided into 16 by again dividing in the same way each of the areas after division into 4 (areas A71-A86). The section lines (L61, L62, L71-78) are established so that the number of ICG1s included in each sectioned area when the original area is divided by these into 2—top and bottom or right and left—will be approximately equal.

With the subdivision method shown in the example in FIG. 13, while some variation in the number of ICG1s included occurs in the sectioned areas after dividing into 4, processing is simpler than the method explained in step ST5 of this embodiment.

Figure 14:
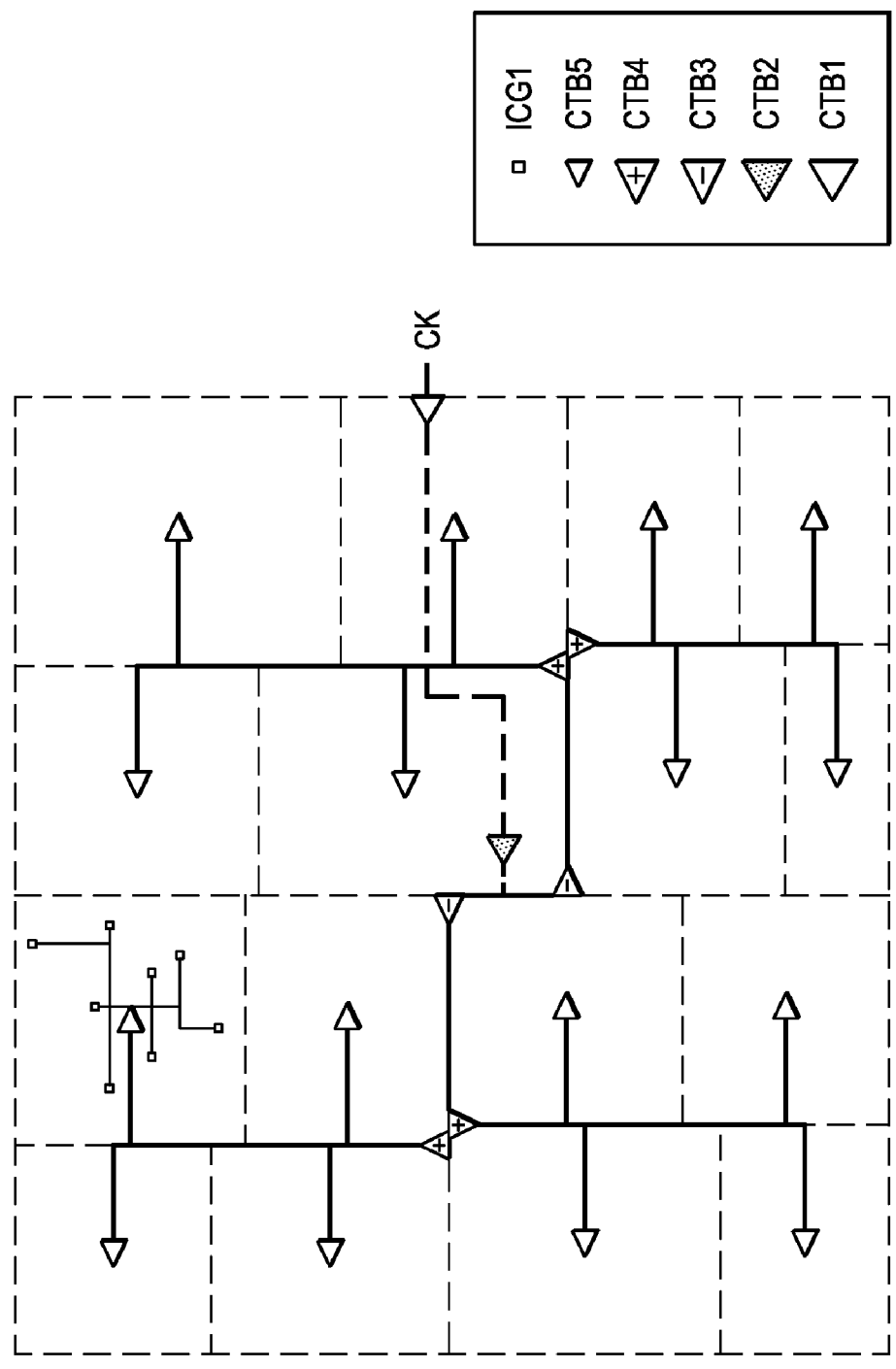
FIG. 14 is a figure explaining a variation in the clock buffer arrangement method.

With the embodiments described above, the CTBs serving as structured buffers are arranged at the points of intersection of section lines, but the present invention is not limited to this. For example, as shown in FIG. 14, the CTBs at clock tree termini could also be disposed in the centers of the areas.

With the embodiments described above, a clock tree that distributes a clock signal was cited as an example, but the present invention is not limited to this. That is, the present invention can be applied to an integrated circuit device provided with any signal distribution circuit that distributes a common signal to multiple circuit elements.

With the embodiments described above, repeaters (CTB1, CTB2) are disposed in levels before the structured buffers (CTB3-CTB5), but the present example is not limited to this example. If the wiring between the structured buffers is longer and the capacitance is larger, repeaters could also be furnished on that wiring.

The layout design method shown in the flow chart in FIG. 1 can also be executed with a computer. In this case, a computer program corresponding to the processing in the flow chart in FIG. 1 is recorded on a hard disk, a semiconductor memory, an optical disk, or any other recording medium, and can be executed by reading to the computer. The program can also be executed downloaded onto a computer over a network from a server.

Although the present invention has been described with reference to a specific embodiment, it is not limited to this embodiment and no doubt alternatives will occur to the skilled person that lie within the scope of the invention as claimed.

The invention claimed is:

1. An integrated circuit device, comprising:
multiple first circuit elements arranged in a first integrated circuit area;
a signal distribution circuit that has multiple drive circuits connected in the form of a tree structure and that distributes a common signal that is input to the starting point of said tree structure to each of the multiple first circuit elements through the same number of levels of drive circuits;
wherein at least some of the drive circuits of the tree structure are arranged one each in each of multiple second integrated circuit areas into which the first integrated circuit area is divided to include approximately the same number of the first circuit elements, and the common signal is supplied to the first circuit elements included in the second integrated circuit area where they are arrange; and
wherein the second integrated circuit areas are subdivisions wherein a higher-order section area is divided into multiple lower-order section areas with section lines that extend longitudinally or laterally in the first integrated circuit areas, and subdivision to divide the higher-order section areas is repeated so that said multiple lower-order section areas include approximately the same number of the first circuit elements.

2. The integrated circuit device described in claim 1, wherein the drive circuits are arranged one each in each of the multiple second integrated circuit areas are the drive circuits at the termini of the tree structure.

3. The integrated circuit device described in claim 1, wherein the drive circuits are arranged at the edges of the second integrated circuit areas.

4. The integrated circuit device described in claim 3, wherein the multiple drive circuits are arranged adjacent to a point of intersection where two or more of the section lines cross.

5. The integrated circuit device described in claim 4, wherein at least one of the drive circuits in the tree structure is disposed adjacent to the point of intersection of a lower-order section line in the subdivision and a section line one order higher than said section line.

6. The integrated circuit device described in claim 5, wherein the multiple drive circuits arranged one each in each of the multiple second integrated circuit areas are arranged adjacent to the point of intersection of the lowest-order section line in the subdivision and a section line one order higher than said section line.

7. The integrated circuit device described in claim 5, wherein the multiple drive circuits are arranged adjacent to a point of intersection of a section line for which the point of intersection is adjacent to the drive circuit in the next level in the tree structure, and a section line of a higher order than said section line.

8. An integrated circuit device comprising:
multiple first circuit elements arranged in a first integrated circuit area;
a signal distribution circuit that has multiple drive circuits connected in the form of a tree structure and that distributes a common signal that is input to the starting point of said tree structure to each of the multiple first circuit elements through the same number of levels of drive circuits;
wherein at least some of the drive circuits of the tree structure are arranged one each in each of multiple second integrated circuit areas into which the first integrated circuit area is divided to include approximately the same number of the first circuit elements, and the common signal is supplied to the first circuit elements included in the second integrated circuit area where they are arrange;
multiple second circuit elements that propagate the common signal output from the multiple first circuit elements;
and multiple third circuit elements to which the common signal is ultimately input from the multiple first circuit elements through the same number of levels of the second circuit elements.

9. The integrated circuit device described in claim 8, wherein at least some of the first circuit elements and the second circuit elements are arranged at the side closest to drive circuits at the termini of the tree structure positioned in a higher-order level, in the smallest quadrilateral integrated circuit area that includes the last-level circuit element group.

10. A layout design method to design the layout of an integrated circuit device comprising multiple first circuit elements arranged in a first integrated circuit area;
a signal distribution circuit that has multiple drive circuits connected in the form of a tree structure, and that distributes a common signal input to the starting point of said tree structure to each of the multiple circuit elements through the same number of levels of drive circuits, multiple second circuit elements that propagate the common signal output from the multiple first circuit elements, and third circuit elements into which the common signal output from the first circuit elements is ultimately input, the method comprising:

sectioning a first integrated circuit area into multiple second integrated circuit areas so that approximately the same number of the first circuit elements is included, arranging at least some of the drive circuits of the tree structure one each into each of the multiple second integrated circuit areas;

inserting the drive circuits as the first circuit elements or the second circuit elements in at least some of the paths so that the same number of levels of the second circuit elements are present in all the paths that propagate the common signal from the multiple first circuit elements to the multiple third circuit elements.

11. The layout design method described in claim 10, wherein the drive circuits that are arranged one each in each of the multiple second integrated circuit areas in the second step are drive circuits at the termini of the tree structure.

* * * * *